US006858171B1

(12) United States Patent
Wu

(10) Patent No.: US 6,858,171 B1
(45) Date of Patent: Feb. 22, 2005

(54) METHOD FOR MAKING REINFORCED BELT PAD FOR LINEAR CHEMICAL MECHANICAL PLANARIZATION

(75) Inventor: Patrick P. H. Wu, Milpitas, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 10/184,152

(22) Filed: Jun. 26, 2002

(51) Int. Cl.[7] .......................... B29C 45/14; B29C 33/12
(52) U.S. Cl. ....................... 264/219; 264/259; 264/275; 264/278
(58) Field of Search .................................. 264/219, 259, 264/271.1, 274, 275, 278, 279, 279.1; 425/121, 577

(56) References Cited

U.S. PATENT DOCUMENTS

| | | | | | |
|---|---|---|---|---|---|
| 4,223,430 A | * | 9/1980 | Sherlaw | ................. | 29/890.122 |
| 4,563,323 A | * | 1/1986 | Breher | .................... | 264/279.1 |
| 5,169,581 A | * | 12/1992 | Ickinger et al. | ............. | 264/138 |
| 5,219,505 A | * | 6/1993 | Kaiser | ........................ | 264/138 |
| 5,695,705 A | * | 12/1997 | Halket et al. | ................ | 264/277 |
| 5,893,796 A | * | 4/1999 | Birang et al. | ............... | 451/526 |
| 6,383,438 B2 | * | 5/2002 | Yagi | .......................... | 264/263 |
| 6,696,005 B2 | * | 2/2004 | Strasbaugh | ................. | 264/263 |

* cited by examiner

Primary Examiner—Angela Ortiz
(74) Attorney, Agent, or Firm—Martine & Penilla, LLP

(57) ABSTRACT

In a method for making a stainless steel reinforced belt pad for linear chemical mechanical planarization (CMP), a stainless steel band is disposed around an inner mold having positioners configured to hold the stainless steel band in place during a molding process. Once the stainless steel band is disposed around the inner mold, pad material is injected into the gap defined between the outer mold and the stainless steel band. An inner mold for making a stainless steel reinforced belt pad for linear CMP includes a cylindrical body and a plurality of positioners affixed to the cylindrical body. The plurality of positioners is arranged so as to hold a stainless steel band disposed around the cylindrical body in place during a molding process. By way of example, suitable positioners include spring-loaded ball plungers.

10 Claims, 2 Drawing Sheets

US 6,858,171 B1

METHOD FOR MAKING REINFORCED BELT PAD FOR LINEAR CHEMICAL MECHANICAL PLANARIZATION

BACKGROUND OF THE INVENTION

The present invention relates to semiconductor fabrication and, more particularly, to a method for making a stainless steel reinforced belt pad for linear chemical mechanical planarization ("CMP").

In the fabrication of semiconductor devices, CMP is used to planarize globally the surface of an entire semiconductor wafer. CMP is often used to planarize dielectric layers as well as metallization layers. As is well known to those skilled in the art, in a CMP operation a wafer is rotated under pressure against a polishing pad in the presence of a slurry. In a linear CMP operation, the polishing pad is typically a belt pad. One known belt pad includes a molded layer of polyurethane disposed on a stainless steel band, which provides reinforcement for the layer of polyurethane.

As the size of integrated circuits continues to decrease, the need for a CMP operation to produce uniformly smooth planarized surfaces increases. In a linear CMP operation, any variation in the thickness of the pad, i.e., the molded layer of polyurethane, can adversely affect the smoothness of the surface being planarized. One drawback of the molding process typically used to form stainless steel reinforced belt pads is that variations in the size and roundness of the stainless steel bands cause the molded polyurethane layer to have a non-uniform thickness, as explained in more detail below with reference to FIG. 1.

FIG. 1 is a simplified top view of a conventional mold for manufacturing a stainless steel reinforced belt pad for a linear CMP system. As shown therein, mold 100 includes outer mold 102 and inner mold 104. Outer mold 102 is in the form of a hollow cylinder and inner mold 104 is in the form a solid cylinder. To begin the molding process, stainless steel band 110 is first placed around inner mold 104. Although the specified diameter and tolerances of stainless steel band 110 are selected so that the stainless steel band will fit snugly around inner mold 104, significant variations in the size and roundness of the manufactured stainless steel band often occur. When stainless steel band 110 does not fit snugly around inner mold 104, space 108 may be formed between the stainless steel band and the inner mold. It is to be understood that the size of space 108 shown in FIG. 1, which is not drawn to scale, is exaggerated for purposes of illustration. Thereafter, when the pad material, e.g., polyurethane, is injected into gap 106 between outer mold 102 and stainless steel band 110, the resulting layer of polyurethane will not have a uniform thickness because the distance between the stainless steel band and the outer mold is not uniform.

One way to ensure that the layer of polyurethane has a uniform thickness would be to machine the layer to a uniform thickness after the molding process. This solution is undesirable for at least two reasons. First, the additional machining step increases the complexity and cost of the molding process. Second, the layer of polyurethane cannot be machined beyond a required minimum thickness. Therefore, if the thin spots in the layer of polyurethane are too exaggerated, then machining back to uniformity is not a viable option.

In view of the foregoing, there is a need for a process for molding stainless steel reinforced belt pads for linear CMP operations that ensures that the pad has a uniform thickness.

SUMMARY OF THE INVENTION

Broadly speaking, the present invention fills this need by providing a method for making a stainless steel reinforced belt pad for linear chemical mechanical planarization (CMP) in which an inner mold having positioners for holding the stainless steel band in place during a molding process is used.

In accordance with one aspect of the present invention, a method for making a stainless steel reinforced belt pad for linear CMP is provided. In this method, a stainless steel band is disposed around an inner mold having positioners configured to hold the stainless steel band in place during a molding process. Once the stainless steel band is disposed around the inner mold, the pad material, e.g., polyurethane, is injected into the gap defined between the outer mold and the stainless steel band.

In one embodiment, the outer mold has a circular shape, and the positioners hold the stainless steel band in a circular shape that is concentric with the outer mold. In one embodiment, the inner mold has eight positioners, with four positioners being substantially evenly spaced around the outer surface of the inner mold at a first position, and four positioners being substantially evenly spaced around the outer surface of the inner mold at a second position. In one embodiment, the first position is below the second position.

In one embodiment, the positioners are spring-loaded plungers. In this embodiment, each spring-loaded plunger is affixed to the inner mold such that a portion thereof protrudes from the outer surface of the inner mold. The body of each spring-loaded ball plunger has external threads, and each spring-loaded ball plunger is disposed in the inner mold by screwing the external threads of the body into a threaded hole formed in the inner mold. In one embodiment, the inner mold has spring-loaded ball plungers disposed therein. In this embodiment, the stainless steel band is disposed around the inner mold such that each ball of each of the spring-loaded ball plungers contacts an inner surface of the stainless steel band.

In accordance with another aspect of the present invention, an inner mold for making a stainless steel reinforced belt pad for linear CMP is provided. The inner mold includes a cylindrical body having a top surface, a bottom surface, and a curved surface extending between the top surface and the bottom surface. A plurality of positioners is affixed to the cylindrical body. The plurality of positioners is arranged so as to hold a stainless steel band disposed around the cylindrical body in place during a molding process.

In one embodiment, the plurality of positioners is substantially evenly spaced around the curved surface of the cylindrical body. In one embodiment, the positioners are spring-loaded ball plungers. In one embodiment, each spring-loaded ball plunger is affixed to the cylindrical body such that a portion of the ball protrudes from the curved surface of the cylindrical body.

The inner mold and the method for making a stainless steel reinforced belt pad for linear CMP of the present invention allow stainless steel reinforced belt pads having a uniform pad thickness to be produced reliably and efficiently. By keeping the stainless steel band uniformly positioned relative to the outer mold during the process of molding the pad material, the positioners provided on the inner mold ensure that the molded belt pad will have a substantially uniform thickness. The positioners are further advantageous in that they provide a degree of adjustability sufficient to accommodate stainless steel bands having different sizes and degrees of roundness. Thus, although the size and degree of roundness of the stainless steel bands used will vary within the range of acceptable tolerances, each molded belt pad will nonetheless have a substantially uniform thickness. Accordingly, the inner mold and method of the present invention enable linear CMP operations to satisfy the need in the semiconductor industry for uniformly smooth planarized surfaces.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE INVENTION

Figure 1:
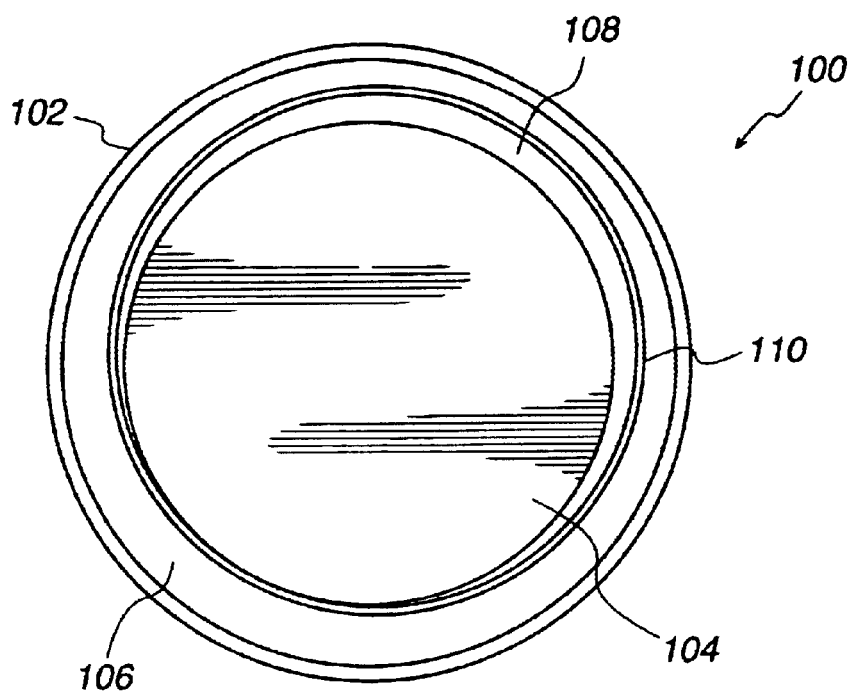
FIG. 1 is a simplified top view of a conventional mold for manufacturing a belt pad for a linear chemical mechanical planarization (CMP) system.

Several exemplary embodiments of the invention will now be described in detail with reference to the accompanying drawings. FIG. 1 has been described above in the "Background of the Invention" section.

Figure 2:
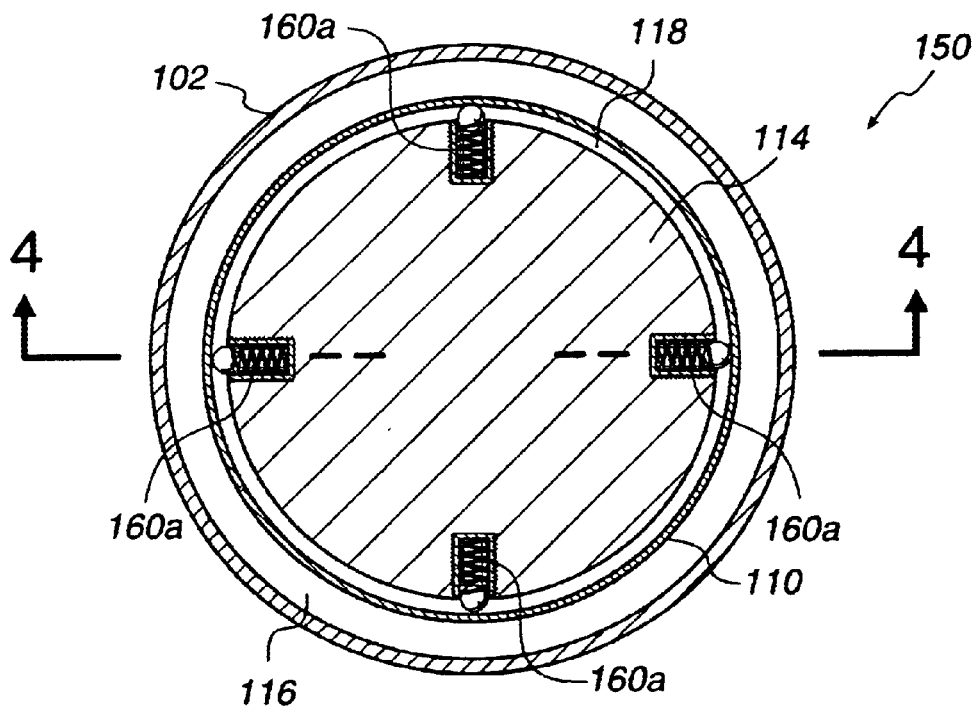
FIG. 2 is a simplified top view of a mold for making a stainless steel reinforced belt pad for a linear CMP system in accordance with one embodiment of the invention.

FIG. 2 is a simplified top view of a mold for making a stainless steel reinforced belt pad for a linear CMP system in accordance with one embodiment of the invention. As shown therein, mold 150 includes inner mold 114 and outer mold 102. Inner mold 114 is in the form of a solid cylinder having a top surface, a bottom surface, and a curved side surface extending between the top surface and the bottom surface. Outer mold 102 is in the form of a hollow cylinder. The outer mold 102 and the inner mold 114 are arranged such that the outer mold is concentric with the inner mold. The inner mold 114 and outer mold 102 may be made of any suitable material, e.g., aluminum. The inner mold 114 is provided with a number of positioners 160 for holding stainless steel band 110 in place during the process of molding the pad material. In the following description, groups of positioners are referred to as positioners 160a and 160b (see FIG. 4).

The number of positioners and the location of the positioners may be varied to suit the needs of particular applications. In one embodiment, inner mold 114 is provided with eight positioners 160, of which a first group of four positioners 160a are visible in FIG. 2. In this embodiment, four positioners 160a are substantially evenly spaced around inner mold 114 at a first position and a second group of four positioners 160b (see FIG. 4) are substantially evenly spaced around the inner mold at a second position, as described in more detail below with reference to FIG. 4.

Positioners 160 may have any configuration suitable for holding stainless steel band 110 in place during the process of molding the pad material. In this regard, it is desirable that positioners 160 be configured to provide a degree of adjustability sufficient to accommodate stainless steel bands having different sizes and degrees of roundness. By way of example, positioners 160 may be spring-loaded devices such as retractable pins or spring-loaded plungers. The spring-loaded plungers may have either a standard cylindrical plunger or a ball plunger. Alternatively, positioners 160 may be inserts formed of a suitable resilient material, e.g., hard rubber. It will be apparent to those skilled in the art that positioners having other configurations also may be used. In one embodiment, as shown in FIG. 2, positioners 160 are spring-loaded ball plungers. Additional details regarding the spring-loaded ball plungers are set forth below with reference to FIG. 3.

With continuing reference to FIG. 2, when stainless steel band 110 is placed around positioners 160, the positioners hold the stainless steel band such that annular space 118 defined between inner mold 114 and the stainless steel band has a substantially uniform thickness. With stainless steel band 110 held in this manner, annular space 116 defined between the stainless steel band and outer mold 102 also has a substantially uniform thickness. When the pad material, e.g., polyurethane, is injected into annular space 116 during the process of molding the belt pad, positioners 160 hold stainless steel band 110 in place so that the stainless steel band does not become misaligned or otherwise move in a non-uniform fashion relative to outer mold 102. By keeping stainless steel band 110 uniformly positioned relative to outer mold 102 during the molding process, the molded belt pad will have a substantially uniform thickness.

Figure 3:
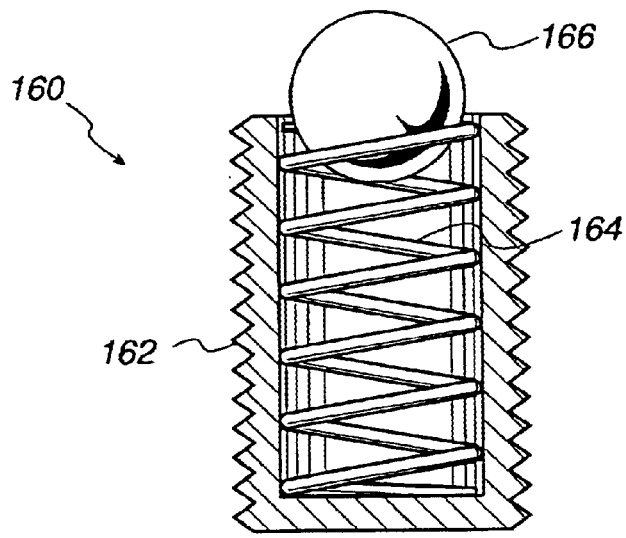
FIG. 3 is a simplified cross-sectional view of an exemplary positioner in accordance with one embodiment of the invention.

FIG. 3 is a simplified cross-sectional view of an exemplary positioner in accordance with one embodiment of the invention. As shown in FIG. 3, positioner 160 is a spring-loaded ball plunger that includes body 162, spring 164, and ball 166, which may be formed of any suitable material, e.g., stainless steel. Body 162 has an external surface that is provided with threads and an internal surface that defines a channel having an opening at one end of the body and an end wall at the other end of the body. Spring 164 and ball 166 are disposed in the channel defined in body 162. Spring 164 is disposed against the end wall of the channel and ball 166 is disposed at the opening of the channel such that a portion of the ball protrudes therefrom. As is well known to those skilled in the art, ball 166 moves into the channel when a force sufficient to compress spring 164 is applied against the portion of the ball that protrudes from the opening in the channel. By way of example, suitable spring-loaded ball plungers include Models 52905, 52906, and 52907, which are commercially available from TE-CO of Union, Ohio.

Figure 4:
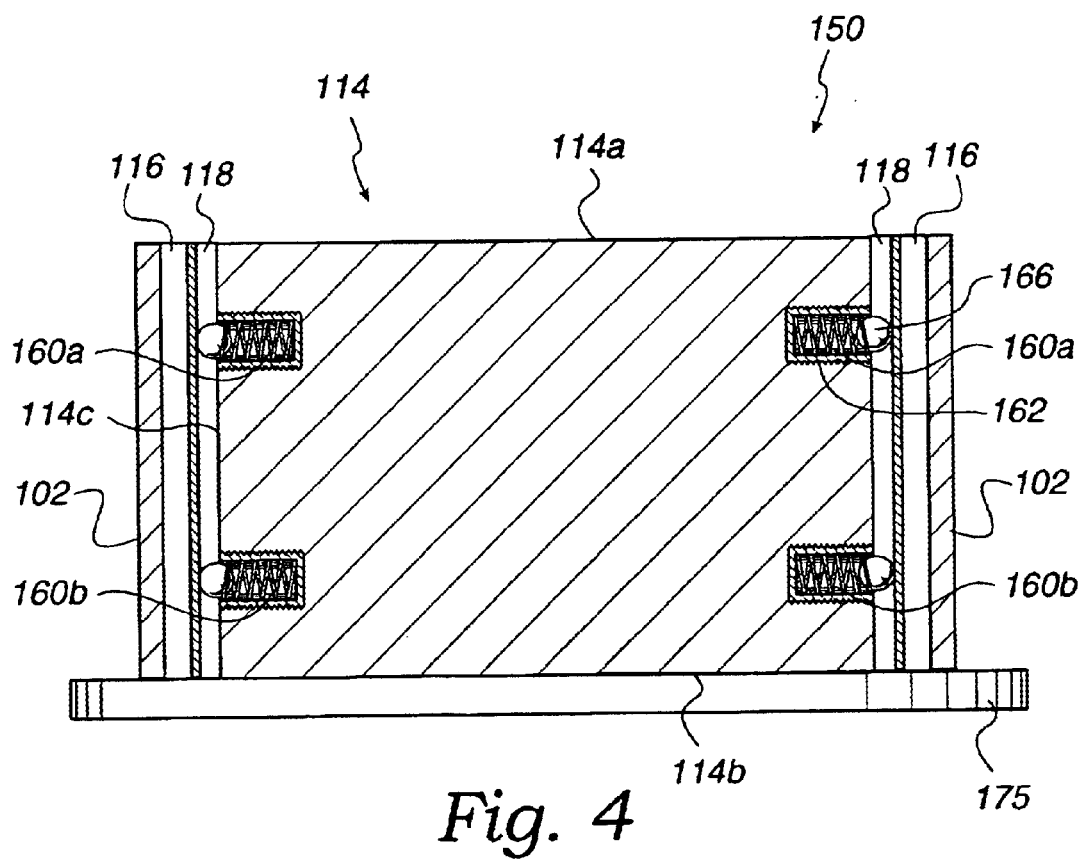
FIG. 4 is a cross-sectional view of the mold shown in FIG. 2 taken along section line 4—4.

FIG. 4 is a cross-sectional view of mold 150 taken along section line 4—4 shown in FIG. 2. As shown therein, inner mold 114 has circular top surface 114a, circular bottom surface 114b, and curved side surface 114c extending between the top surface and the bottom surface. Inner mold 114 and outer mold 102 of mold 150 are disposed on bottom 175. As set forth above in connection with the description of FIG. 2, inner mold 114 is provided with eight positioners 160, which are in the form of spring-loaded ball plungers. As shown in FIG. 4, each of positioners 160 is disposed within inner mold 114 such that a portion of ball 166 protrudes a desired distance from the outer surface of the inner mold. Positioners 160 are disposed within inner mold 114 by screwing body 162, which has threads on the outer surface thereof, into complementarily threaded holes formed in the inner mold. The holes in inner mold 114 may be formed by first drilling holes in the curved side surface of the inner mold, and then using an appropriate tap to provide each hole with threads that are complementary to the threads on the outer surface of body 162.

With continuing reference to FIG. 4, when stainless steel band 110 is disposed around inner mold 114, the protruding portions of balls 166 of positioners 160a and 160b contact the inner surface of the stainless steel band and hold the stainless steel band in place during the process of molding the pad material. Those skilled in the art will recognize that positioners 160 should be disposed within inner mold 114 so that the outermost portions thereof, i.e., the protruding portions of balls 166, can accommodate the largest stainless steel band that will be used in the manufacture of the stainless steel reinforced belt pads for linear CMP. This configuration also will accommodate any smaller stainless steel bands used because such stainless steel bands will cause balls 166 to compress springs 164 and move inwardly into the channel. In this manner, the positioners provide the inner mold with a degree of adjustability sufficient to accommodate stainless steel bands having sizes and degrees of roundness that vary within the range of acceptable tolerances for the process.

In the cross-section shown in FIG. 4, only two of the four upper positioners 160a and two of the four lower positioners 160b are visible. As shown in FIG. 2, the four upper positioners 160a are substantially evenly spaced around inner mold 114 at approximately 90-degree intervals. The four lower positioners 160b also may be substantially evenly spaced around inner mold 114 at approximately 90-degree intervals. The use of both upper positioners 160a and lower positioners 160b enables inner mold 114 to support stainless steel band 110 uniformly over the entire length of the stainless steel band. In one embodiment, positioners 160a and 160b hold stainless steel band 110 in a circular shape that is concentric with a circular shape of outer mold 102. It will be apparent to those skilled in the art that other positioner arrangements also may be used, with any arrangement of the positioners that adequately supports the stainless steel band being satisfactory.

The inner mold and the method for making a stainless steel reinforced belt pad for linear CMP of the present invention allow stainless steel reinforced belt pads having a uniform pad thickness to be produced reliably and efficiently. By keeping the stainless steel band uniformly positioned relative to the outer mold during the process of molding the pad material, the positioners provided on the inner mold ensure that the molded belt pad will have a substantially uniform thickness. The positioners are further advantageous in that they provide a degree of adjustability sufficient to accommodate stainless steel bands having different sizes and degrees of roundness. Thus, although the size and degree of roundness of the stainless steel bands used will vary within the range of acceptable tolerances, each molded belt pad will nonetheless have a substantially uniform thickness. Accordingly, the inner mold and method of the present invention enable linear CMP operations to satisfy the need in the semiconductor industry for uniformly smooth planarized surfaces.

In summary, the present invention provides an inner mold and a method for making a stainless steel reinforced belt pad for linear CMP. The invention has been described herein in terms of several exemplary embodiments. Other embodiments of the invention will be apparent to those skilled in the art from consideration of the specification and practice of the invention. By way of example, positioners other than spring-loaded ball plungers may be used. In addition, the number of positioners and the arrangement of the positioners may be varied from that specifically shown and described herein. The embodiments and preferred features described above should be considered exemplary, with the invention being defined by the appended claims and equivalents thereof.

What is claimed is:

1. A method for making a stainless steel reinforced belt pad for linear chemical mechanical planarization, comprising:

disposing a stainless steel band around an inner mold having spring-loaded plungers configured to hold the stainless steel band in place during a molding process, each spring-loaded plunger having an external threaded body, and each spring-loaded plunger being affixed to the inner mold such that a portion thereof protrudes from an outer surface of the inner mold by screwing the external threaded body into a threaded hole formed in the inner mold; and injecting material into a gap defined between an outer mold and the stainless steel band.

2. The method of claim 1, wherein the outer mold has a circular shape, and the spring-loaded plungers hold the stainless steel band in a circular shape that is concentric with the outer mold.

3. The method of claim 1, wherein the inner mold has eight spring-loaded plungers, with four spring-loaded plungers being substantially evenly spaced around the outer surface of the inner mold at a first position, and four spring-loaded plungers being substantially evenly spaced around the outer surface of the inner mold at a second position.

4. The method of claim 3, wherein the first position is below the second position.

5. A method for positioning a stainless steel band relative to an inner mold in the manufacture of a stainless steel reinforced belt pad for linear chemical mechanical planarization, comprising:

providing an inner mold having spring-loaded ball plungers disposed therein, each spring-loaded plunger having a ball that protrudes from a body of the spring-loaded plunger; and disposing a stainless steel band around the inner mold such that each ball of each of the spring-loaded ball plungers contacts an inner surface of the stainless steel band.

6. The method of claim 5, wherein the spring-loaded ball plungers are substantially evenly spaced around the outer surface of the inner mold.

7. The method of claim 5, wherein the inner mold has eight spring-loaded ball plungers disposed therein, with four spring-loaded ball plungers being substantially evenly spaced around the outer surface of the inner mold at a first position, and four spring-loaded ball plungers being substantially evenly spaced around the outer surface of the inner mold at a second position.

8. The method of claim 7, wherein the first position is below the second position.

9. The method of claim 5, wherein the body of each spring-loaded ball plunger has external threads, and each spring-loaded ball plunger is disposed in the inner mold by screwing the external threads of the body into a threaded hole formed in the inner mold.

10. The method of claim 5, wherein the spring-loaded ball plungers hold the stainless steel band in a circular shape that is concentric with a circular shape of an outer mold.

* * * * *